United States Patent
Govindarao et al.

(10) Patent No.: US 9,679,220 B2
(45) Date of Patent: Jun. 13, 2017

(54) METHOD, APPARATUS AND COMPUTER PROGRAM PRODUCT FOR DISPARITY ESTIMATION IN IMAGES

(71) Applicant: Nokia Corporation, Espoo (FI)

(72) Inventors: Krishna Annasagar Govindarao, Bangalore (IN); Soumik Ukil, Bangalore (IN); Veldandi Muninder, San Jose, CA (US)

(73) Assignee: Nokia Technologies Oy, Espoo (FI)

( * ) Notice: Subject to any disclaimer, the term of this patent is extended or adjusted under 35 U.S.C. 154(b) by 119 days.

(21) Appl. No.: 14/700,052

(22) Filed: Apr. 29, 2015

(65) Prior Publication Data
US 2015/0332472 A1 Nov. 19, 2015

(30) Foreign Application Priority Data
May 16, 2014 (IN) .......................... 2453/CHE/2014

(51) Int. Cl.
    *G06K 9/00* (2006.01)
    *G06K 9/68* (2006.01)
    *G06K 9/46* (2006.01)
    *G06T 1/00* (2006.01)
    *G06T 9/40* (2006.01)
    *G06K 9/32* (2006.01)
    *G06F 17/30* (2006.01)
    *G06T 7/00* (2017.01)
    (Continued)

(52) U.S. Cl.
CPC ....... *G06K 9/469* (2013.01); *G06F 17/30958* (2013.01); *G06K 9/3233* (2013.01); *G06T 1/0007* (2013.01); *G06T 7/11* (2017.01); *G06T 7/162* (2017.01); *G06T 7/97* (2017.01); *G06T 9/40* (2013.01); *G06K 2009/3291* (2013.01); *G06T 2207/10004* (2013.01); *G06T 2207/10028* (2013.01); *G06T 2207/20072* (2013.01)

(58) Field of Classification Search
USPC .......................................... 382/226, 108, 154
See application file for complete search history.

(56) References Cited

FOREIGN PATENT DOCUMENTS

CN     103218776 A     7/2013

OTHER PUBLICATIONS

Felzenszwalb et al., "Efficient Graph-Based Image Segmentation", International Journal of Computer Vision, vol. 59, No. 2, Sep. 2004, pp. 1-26.

(Continued)

Primary Examiner — Kathleen Y Dulaney
(74) Attorney, Agent, or Firm — Nokia Technologies Oy

(57) ABSTRACT

In an example embodiment, a method, apparatus and computer program product are provided. The method includes facilitating receipt of an image of a scene and determining a graph based on connecting nodes of the image. The nodes are either pixels or superpixels of the image. The graph is determined by determining one or more connections of a node to one or more nodes belonging to a pre-defined image region around the node in the image. The connections are associated with edge weights that are determined based on at least one of similarity parameters and spatial distances between the node and the one or more nodes. The method includes determining disparity values at the nodes of the image based at least on performing tree based aggregation of a cost volume on the graph, where the cost volume is associated with the image and at least one view image of the scene.

18 Claims, 7 Drawing Sheets

(51) Int. Cl.
*G06T 7/11* (2017.01)
*G06T 7/162* (2017.01)

(56) References Cited

OTHER PUBLICATIONS

Hidane et al., "Nonlocal Multiscale Hierarchical Decomposition on Graphs", European Conference on Computer Vision, vol. 6314, 2010, pp. 638-650.

Bansal et al., "Joint Spectral Correspondence for Disparate Image Matching", IEEE Conference on Computer Vision and Pattern Recognition, Jun. 23-28, 2013, 8 pages.

Chen et al., "An Improved Non-Local Cost Aggregation Method for Stereo Matching Based on Color and Boundary Cues", IEEE International Conference on Multimedia and Expo, Jul. 15-19, 2013, pp. 1-6.

Yang, "A Non-Local Cost Aggregation Method for Stereo Matching", IEEE Conference on Computer Vision and Pattern Recognition, Jun. 16-21, 2012, 8 pages.

Mei et al., "Segment-Tree Based Cost Aggregation for Stereo Matching", IEEE Conference on Computer Vision and Pattern Recognition, Jun. 23-28, 2013, pp. 313-320.

Smith et al., "Stereo Matching With Nonparametric Smoothness Priors in Feature Space", IEEE Conference on Computer Vision and Pattern Recognition, Jun. 20-25, 2009, pp. 485-492.

METHOD, APPARATUS AND COMPUTER PROGRAM PRODUCT FOR DISPARITY ESTIMATION IN IMAGES

TECHNICAL FIELD

Various implementations relate generally to method, apparatus, and computer program product for disparity estimation in digital images.

BACKGROUND

Various electronic devices, for example, cameras, mobile phones, and other multimedia devices are widely used for capturing digital images. Some electronic devices are capable of capturing stereoscopic/multiple view images of a scene, and performing disparity map estimation of a scene using the stereoscopic images and/or multi-view images. Disparity map estimation is a process that determines shifts in pixels between the multiple view images of the scene. Several disparity estimation techniques use cost aggregation on a tree based graph for each pixel in the images. However, such techniques suffer from a drawback in highly textured regions where the cost aggregation is not as effective as in other regions.

SUMMARY OF SOME EMBODIMENTS

Various aspects of example embodiments are set out in the claims.

In a first aspect, there is provided a method comprising: facilitating receipt of an image of a scene; determining a graph based on connecting a plurality of nodes of the image, the plurality of nodes being pixels or superpixels of the image, wherein determining the graph comprises determining one or more connections of a node of the plurality of nodes to one or more nodes of the plurality of nodes, the one or more nodes belonging to a pre-defined image region around the node in the image, the one or more connections being associated with corresponding edge weights determined based on at least one of similarity parameters and spatial distances between the node and the one or more nodes; and determining disparity values at the plurality of nodes of the image based at least on performing a tree based aggregation of a cost volume on the graph, the cost volume associated with the image and at least one view image of the scene, the at least one view image comprising a different view of the scene than a view of the scene in the image.

In a second aspect, there is provided an apparatus comprising at least one processor; and at least one memory comprising computer program code, the at least one memory and the computer program code configured to, with the at least one processor, cause the apparatus to at least perform: facilitate receipt of an image of a scene; determine a graph based on connecting a plurality of nodes of the image, the plurality of nodes being pixels or superpixels of the image, wherein determining the graph comprises determining one or more connections of a node of the plurality of nodes to one or more nodes of the plurality of nodes, the one or more nodes belonging to a pre-defined image region around the node in the image, the one or more connections being associated with corresponding edge weights determined based on at least one of similarity parameters and spatial distances between the node and the one or more nodes; and determine disparity values at the plurality of nodes of the image based at least on performing a tree based aggregation of a cost volume on the graph, the cost volume associated with the image and at least one view image of the scene, the at least one view image comprising a different view of the scene than a view of the scene in the image.

In a third aspect, there is provided a computer program product comprising at least one computer-readable storage medium, the computer-readable storage medium comprising a set of instructions, which, when executed by one or more processors, cause an apparatus to at least perform: facilitate receipt of an image of a scene; determine a graph based on connecting a plurality of nodes of the image, the plurality of nodes being pixels or superpixels of the image, wherein determining the graph comprises determining one or more connections of a node of the plurality of nodes to one or more nodes of the plurality of nodes, the one or more nodes belonging to a pre-defined image region around the node in the image, the one or more connections being associated with corresponding edge weights determined based on at least one of similarity parameters and spatial distances between the node and the one or more nodes; and determine disparity values at the plurality of nodes of the image based at least on performing a tree based aggregation of a cost volume on the graph, the cost volume associated with the image and at least one view image of the scene, the at least one view image comprising a different view of the scene than a view of the scene in the image.

In a fourth aspect, there is provided an apparatus comprising: means for facilitating receipt of an image of a scene; means for determining a graph based on connecting a plurality of nodes of the image, the plurality of nodes being pixels or superpixels of the image, wherein determining the graph comprises determining one or more connections of a node of the plurality of nodes to one or more nodes of the plurality of nodes, the one or more nodes belonging to a pre-defined image region around the node in the image, the one or more connections being associated with corresponding edge weights determined based on at least one of similarity parameters and spatial distances between the node and the one or more nodes; and means for determining disparity values at the plurality of nodes of the image based at least on performing a tree based aggregation of a cost volume on the graph, the cost volume associated with the image and at least one view image of the scene, the at least one view image comprising a different view of the scene than a view of the scene in the image.

In a fifth aspect, there is provided a computer program comprising program instructions which when executed by an apparatus, cause the apparatus to: facilitate receipt of an image of a scene; determine a graph based on connecting a plurality of nodes of the image, the plurality of nodes being pixels or superpixels of the image, wherein determining the graph comprises determining one or more connections of a node of the plurality of nodes to one or more nodes of the plurality of nodes, the one or more nodes belonging to a pre-defined image region around the node in the image, the one or more connections being associated with corresponding edge weights determined based on at least one of similarity parameters and spatial distances between the node and the one or more nodes; and determine disparity values at the plurality of nodes of the image based at least on performing a tree based aggregation of a cost volume on the graph, the cost volume associated with the image and at least one view image of the scene, the at least one view image comprising a different view of the scene than a view of the scene in the image.

BRIEF DESCRIPTION OF THE FIGURES

Various embodiments are illustrated by way of example, and not by way of limitation, in the figures of the accompanying drawings in which.

DETAILED DESCRIPTION

Example embodiments and their potential effects are understood by referring to FIGS. 1 through 6 of the drawings.

Figure 1:
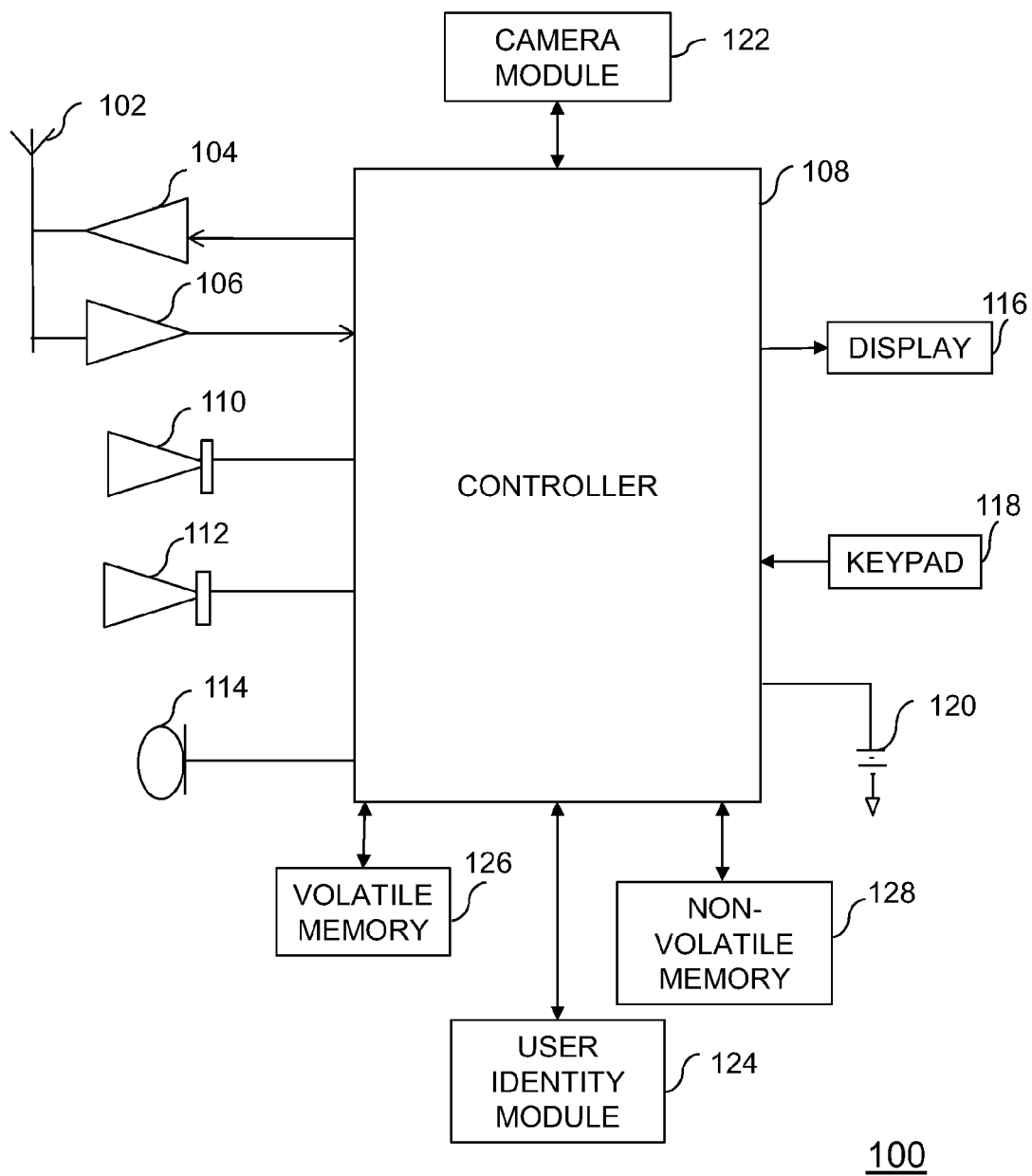
FIG. 1 illustrates a device, in accordance with an example embodiment.

FIG. 1 illustrates a device 100, in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of touch screen based mobile electronic devices, for example, portable digital assistants (PDAs), mobile televisions, gaming devices, cellular phones, all types of computers (for example, laptops, mobile computers or desktops), cameras, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as include Bluetooth® networks, Zigbee® networks, Institute of Electric and Electronic Engineers (IEEE) 802.11x networks, and the like; wireline telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional web browser. The connectivity program may then allow the device 100 to transmit and receive web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media capturing element, such as a camera, video and/or audio module, in communication with the controller 108. The media capturing element may be any means for capturing an image, video and/or audio for storage, display or transmission. In an example embodiment in which the media capturing element is a camera module 122, the camera module 122 may include a digital camera capable of forming a digital image file from a captured image. As such, the camera module 122 includes all hardware, such as a lens or other optical component(s), and software for creating a digital image file from a captured image. Alternatively, the camera module 122 may include the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. Moreover, in an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
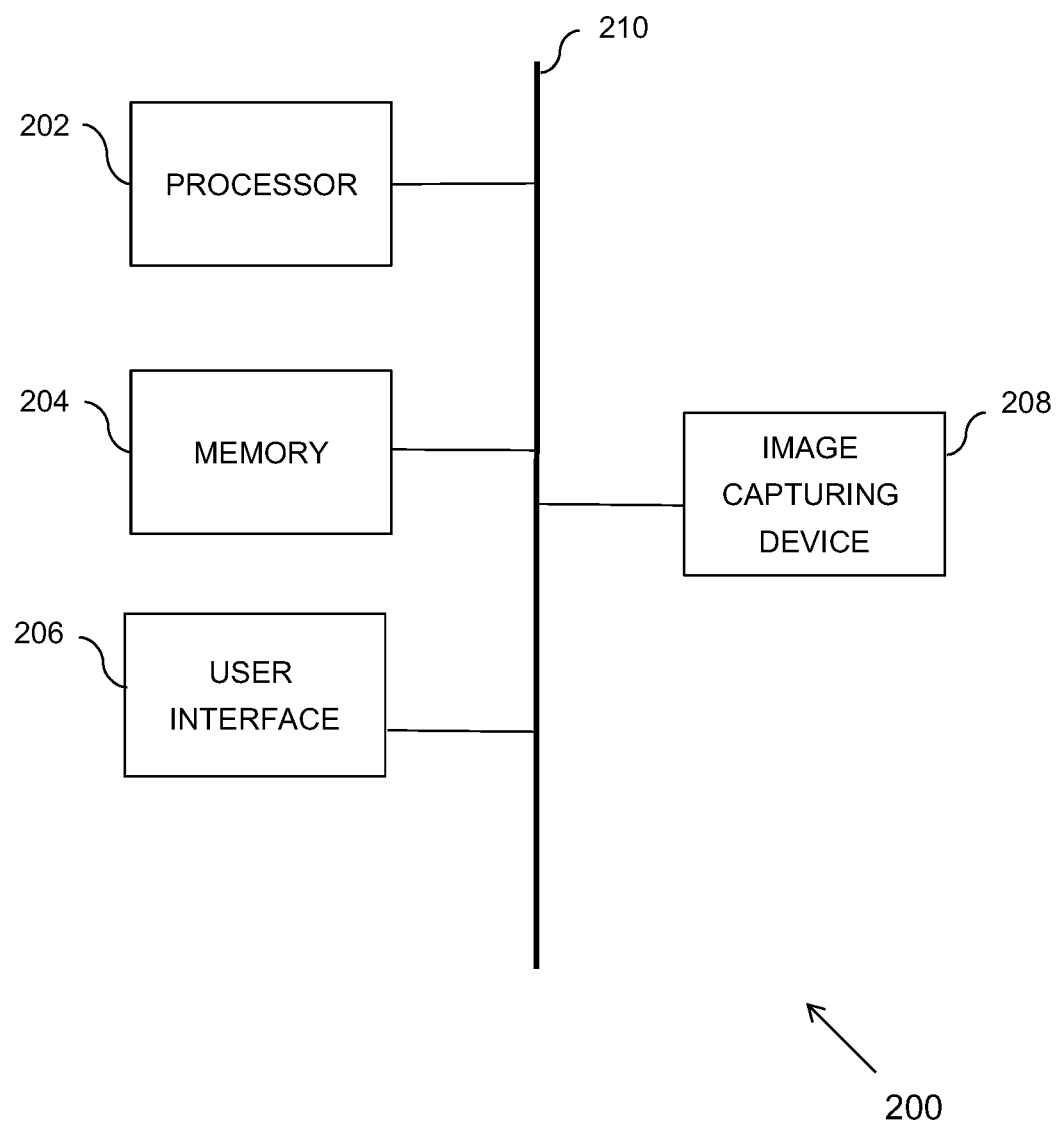
FIG. 2 illustrates an apparatus for disparity estimation of digital images, in accordance with an example embodiment.

FIG. 2 illustrates an apparatus 200 for disparity estimation of digital images, in accordance with an example embodiment. The apparatus 200 may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. Alternatively, embodiments may be employed on a combination of devices including, for example, those listed above. Accordingly, various embodiments may be embodied wholly at a single device, for example, the device 100 or in a combination of devices. Furthermore, it should be noted that the devices or elements described below may not be mandatory and thus some may be omitted in certain embodiments.

The apparatus 200 includes or otherwise is in communication with at least one processor 202 and at least one memory 204. Examples of the at least one memory 204 include, but are not limited to, volatile and/or non-volatile memories. Some examples of the volatile memory include, but are not limited to, random access memory, dynamic random access memory, static random access memory, and the like. Some examples of the non-volatile memory include, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data comprising media content for processing by the processor 202. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, input interface and/or output interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include an electronic device. Some examples of the electronic device include communication device, media capturing device with or without communication capabilities, computing devices, and the like. Some examples of the electronic device may include a mobile phone, a personal digital assistant (PDA), and the like. Some examples of computing device may include a laptop, a personal computer, and the like. In an example embodiment, the electronic device may include a user interface, for example, the user interface 206, having user interface circuitry and user interface software configured to facilitate a user to control at least one function of the electronic device through use of a display and further configured to respond to user inputs. In an example embodiment, the electronic device may include a display circuitry configured to display at least a portion of the user interface 206 of the electronic device. The display and display circuitry may be configured to facilitate the user to control at least one function of the electronic device.

In an example embodiment, the electronic device may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus 200 or circuitry to perform the functions of the transceiver. The transceiver may be configured to receive media content. Examples of the media content may include audio content, video content, data, and a combination thereof.

In an example embodiment, the electronic device may be embodied as to include an image capturing device 208. The image capturing device 208 may be an example of a light-field camera capable of capturing multiple views of a scene, or a stereoscopic camera capable of capturing a stereoscopic pair of images, or even a standard camera capable of capturing multiple views of the scene by moving the camera.

The image capturing device 208 may be in communication with the processor 202 and/or other components of the apparatus 200. The image capturing device 208 may be in communication with other imaging circuitries and/or software, and is configured to capture digital images or to capture video or other graphic media. In an example embodiment, the image capturing device 208 may be an array camera, or a plenoptic camera capable of capturing light-field images (having multiple views of the same scene) and various view images of the scene be generated from such captured images. In another example embodiment, the image capturing device 208 may include the stereoscopic camera capable of capturing two different view images. The image capturing device 208, and other circuitries, in combination, may be examples of at least one camera module such as the camera module 122 of the device 100.

These components (202-208) may communicate to each other via a centralized circuit system 210 to facilitate disparity estimation of digital images. The centralized circuit system 210 may be various devices configured to, among other things, provide or enable communication between the components (202-208) of the apparatus 200. In certain embodiments, the centralized circuit system 210 may be a central printed circuit board (PCB) such as a motherboard, main board, system board, or logic board. The centralized circuit system 210 may also, or alternatively, include other printed circuit assemblies (PCAs) or communication channel media.

In an example embodiment, the apparatus 200 is caused to perform disparity estimation of digital images. In this example embodiment, the processor 202 is configured to, with the content of the memory 204, and optionally with other components described herein, to cause the apparatus 200 to facilitate receipt of an image for example, an image (I). In this example embodiment, the processor 202 is configured to, with the content of the memory 204, and optionally with other components described herein, to cause the apparatus 200 to facilitate receipt of at least one view image (I') of a scene. Herein, the view image (I') represents another image of the scene that has a slightly different view than that of the image (I). Herein, the 'scene' refers to an arrangement (natural, manmade, sorted or assorted) of one or more objects of which images and/or videos can be captured. In an example embodiment, the image (I) and the view image (I') may also be a stereoscopic pair of images of the scene. In an example embodiment, the apparatus 200 is caused to receive a light-field image and may be configured to generate the image (I) and the at least one view image (I') of the scene. In an example embodiment, the image (I) is associated with the scene including one or more objects of various depths in the scene. In an example, the image (I) is captured by the image capturing device 208 present in or otherwise accessible to the apparatus 200. In some other examples, the image (I) and the view image (I') may be prerecorded or stored in the apparatus 200, or may be received from sources external to the apparatus 200. In such example embodiments, the apparatus 200 is caused to receive the image (I) and the view image (I') from external storage medium such as DVD, Compact Disk (CD), flash drive, memory card, or from external storage locations through Internet, Bluetooth®, and the like. In an example embodiment, a processing means may be configured to facilitate receipt of the image (I). An example of the processing means may include the processor 202, which may be an example of the controller 108, and the image capturing device 208.

In an example embodiment, the processor 202 is configured to, with the content of the memory 204, and optionally with other components described herein, to cause the apparatus 200 to determine the graph based on connecting a plurality of nodes of the image (I). For example, the graph may be determined based on determining connections between the plurality of nodes of the image (I). Examples of the plurality of nodes include plurality of pixels and/or a plurality of superpixels in the image (I). For example, in an example embodiment, the graph may be determined based on connections determined between pixels of the image (I). In another embodiment, the graph may be determined based on connections determined between superpixels of the image (I). In yet another embodiment, the graph may be determined based on connections determined between some pixels and some superpixels of the image (I). Herein, a 'superpixel' refers to a set of pixels, where the set of pixels is a combination of pixels that are homogeneous based on common properties, for example color, intensity, or texture and that are spatially close to each other. In an example embodiment, the apparatus 200 may be caused to perform segmentation of the image (I) into the plurality of superpixels. In another example embodiment, the apparatus 200 may be caused to access the plurality of superpixels already defined in the image (I) and received from sources external to the apparatus 200. In an example embodiment, a processing means may be configured to determine the graph. An example of the processing means may include the processor 202, which may be an example of the controller 108.

In an example embodiment, the apparatus 200 is caused to determine one or more connections of a node of the plurality of nodes to one or more nodes of the plurality of nodes, where the one or more nodes belong to a pre-defined image region around the node in the image (I). In an example embodiment, the one or more connections of the node have corresponding edge weights that are determined based on similarity parameters between the node and the one or more nodes and/or spatial distances between the node and the one or more nodes. For instance, in an example embodiment, edge weights associated with the one or more connections of the node may be determined based on similarity parameters between the node and the one or more nodes. In another example embodiment, the edge weights associated with the one or more connections of the node may be determined based on spatial distances between the node and the one or more nodes. In yet another example embodiment, the edge weights associated with the one or more connections of the node may be determined based on the similarity parameters between the node and the one or more nodes and the spatial distances between the node and the one or more nodes. In an example embodiment, the one or more connections are determined for each node of the plurality of nodes of the image, and all connections for the plurality of nodes form a set of connections of the image. In an example embodiment, the graph represents the set of connections that connect the plurality of nodes of the image, where each connection of the set of connections has a corresponding edge weight.

In an example embodiment, the pre-defined image region around a node is an image region defined by a local neighborhood of the node. In an example embodiment, the local neighborhood may comprise a pre-defined order of neighboring nodes around the node. For example, if the local neighborhood includes a 5-order of neighboring nodes around a node Ni (where i varies to include all nodes of the image), then the local neighborhood includes nodes Nj, Nk, Nl, Nm and Nn. In this example, the nodes Nj may be immediate neighboring (adjoining neighboring nodes that are spatially adjacent to the node Ni) nodes of the node Ni, Nk represents immediate neighboring nodes of the node Nj, Nl represents immediate neighboring nodes of the node Nk, Nm represents immediate neighboring nodes of the node Nl, and Nn represents immediate neighboring nodes of the node Nm. An example representation of the local neighborhood of the node is further described with reference to FIG. 3A. In another example embodiment, the pre-defined image region is an image region defined by nodes located within a pre-defined spatial distance from the node. For example, for the node Ni (where i varies to include all nodes of the image), the one or more nodes that lie within the pre-defined spatial distance from the node Ni may be connected to the node Ni. For instance, in this example embodiment, the pre-defined image region around the node Ni may include all those nodes that belong within (or lie within) the spatial distance of radius (R) from the node Ni.

In an example embodiment, the apparatus 200 is configured to determine the one or more connections for all nodes of the plurality of nodes with their respective one or more nodes belonging to the pre-defined image regions (a local neighborhood or within a pre-defined spatial distance) around the nodes. For instance, if there are a plurality of nodes (N1, N2 . . . Nn), the one or more connections are individually determined for each of the plurality of nodes (N1, N2 . . . Nn). In an example embodiment, the apparatus 200 is caused to determine the graph based on the connections of the plurality of nodes (N1, N2 . . . Nn). It should be noted that the spatial distance between the two nodes that are pixels may be a spatial difference between the locations of the two pixels. Further, it should be noted that the spatial distance between the two nodes that are superpixels may be a spatial difference between locations of centroids of the two superpixels. In an example embodiment, a processing means may be configured to determine the one or more connections of the node. An example of the processing means may include the processor 202, which may be an example of the controller 108.

In an example embodiment, the apparatus 200 is caused to determine one or more connections of a node, for example, the node N1, to one or more nodes of the plurality of nodes (N2 . . . Nm) based on a similarity parameter between the node N1 and the one or more nodes of the plurality of nodes (N2 . . . Nm). In an example, a node (Ni, where i varies to include all nodes of the image, for example, 1 to m) may be connected to the one or more nodes that belong to (for example, lie within) a local neighborhood of Ni or within the pre-defined spatial distance (for example, nodes belonging within a radius (R) from the node Ni in the image) from the node Ni. In an example, even if a node, for example N3 is not spatially connected to the node N1 (for example, N3 is not an adjoining neighboring node to the node N1), but node N3 is similar to the node N1 based on the similarity parameter between the nodes N1 and N3 and the node N3 lies within the pre-defined spatial distance from the node N1, a connection may be determined between the node N1 and the node N3. Similarly, the node N1 may be connected to other similar nodes within the pre-defined spatial distance from the node N1. In an example embodiment, the connections of the node N1 may be determined to all nodes belonging to the pre-defined image region around the node. However, in some example embodiments, the connections of the node N1 may be determined to adjoining neighboring nodes of the node N1 and also to only similar nodes of the node N1 that belong to the pre-defined image region (for example, lie within the pre-defined image region). In an example embodiment, the graph is determined by connecting all of the plurality of nodes (N1, N2 ... Nn) of the image in this manner, where each given node is connected to the one or more nodes that are within the pre-defined image region of the given node.

In an example embodiment, the apparatus 200 is caused to determine edge weights associated with the one or more connections of the node (Ni). In an example embodiment, the edge weights are determined based on similarity parameters between the nodes. For example, the similarity parameters may be determined between the node Ni and the one or more nodes (belonging to the pre-defined image region around the node N1) and accordingly edge weights may be determined based on the determined similarity parameters. In an example embodiment, the similarity parameters between two nodes may be based on matching the similarity parameters including, but not limited to color, texture and intensity between the nodes. For instance, in an example, the similarity parameters between the two nodes, Ni and Nj, may be determined by a similarity distance between the color of the nodes Ni and Nj. In an example, a similarity distance between the nodes Ni and Nj may be determined based on an expression:

$$D(Ni,Nj)=\text{Max}\{\text{abs}(R(Ni)-R(Nj)),\text{abs}(G(Ni)-G(Nj)),\text{abs}(B(Ni)-B(Nj))\},$$

where $D(Ni, Nj)$ is the distance between the nodes Ni and Nj, where $R(Ni)$, $G(Ni)$ and $B(Ni)$ represent red component, green component and blue component, respectively for the node Ni, if the node Ni is a pixel. The $R(Ni)$, $G(Ni)$ and $B(Ni)$ represent average of all red, blue and green pixels in the node Ni, if the node Ni is a superpixel. The $R(Nj)$, $G(Nj)$ and $B(Nj)$ represent red component, green component and blue component for the node Nj, if the node Nj is a pixel. The $R(Nj)$, $G(Nj)$ and $B(Nj)$ represent average of all red, blue and green pixels in the node Nj, if the node Nj is a superpixel. It should be noted that for determining the one or more connections of the node Ni, only those nodes (Nj) are considered that are within the pre-defined image region around the node Ni. For instance, variable Ni represents any node of the image, and the variable Nj represents any node of the image that belong to the pre-defined image region (for example, belonging to a local neighborhood of Ni or lying at a spatial distance less than the pre-defined spatial distance from the node Ni). An example representation of the connection of the nodes is further described with reference to FIG. 3B.

In an example embodiment, an edge weight of a connection between the nodes Ni and Nj (pixels or superpixels) not only depends upon the similarity parameters between the nodes Ni and Nj, but also on a spatial distance between the nodes Ni and Nj in the image. It should be noted that in the case of nodes (Ni and Nj) being pixels, the spatial distance between Ni and Nj is the spatial difference between pixels Ni and Nj in the image. Further, in the case of nodes (Ni and Nj) being superpixels, the spatial distance between the superpixels (Ni and Nj) can be a difference between centroids of the superpixels (Ni and Nj).

In another example embodiment, for determining the graph, the apparatus 200 is caused to access a texture map including texture information for the plurality of nodes. In an example embodiment, the texture information for an individual node of the plurality of nodes represents whether the individual node belongs to a textured region in the image or belongs to a non-textured region in the image. For example, the apparatus 200 may be caused to access a texture map $T(x, y)$, where $(x, y)$ represents a location of a node in the image. In an example embodiment, if a node $(x, y)$ belongs to the textured region of the image, the $T(x, y)$ may be set as 1; and if the node $(x, y)$ belongs to the non-textured region of the image, the $T(x, y)$ may be set as 0. In an example embodiment, the texture map $T(x, y)$ may be obtained by computing an edge map of the image (for example, by applying Canny edge detector) and by performing a morphological dilation of the edge map. In an example embodiment, a processing means may be configured to access the texture map. An example of the processing means may include the processor 202, which may be an example of the controller 108.

In an example embodiment, the apparatus 200 is caused to define the one or more connections of the node based on the texture information. For example, in an example embodiment, if the node belongs to the textured regions of the image, the one or more connections are determined for the node to one or more nodes, where the one or more nodes may not necessarily be adjacent neighboring nodes but the one or more nodes may belong to the pre-defined image region around the node. However, in an example embodiment, if the node does not belong to a textured region of the image (for example, the node belongs to a non-textured region), the one or more connections of the node may only be determined to the one or more nodes that are first-order neighboring nodes (for example, adjoining neighboring nodes) of the node. It should be noted that in those example embodiments where, for a node belonging to the non-textured region, connections are determined to only the first-order neighboring nodes (and not with those nodes that are not spatially connected to the node), computational complexity is reduced. In an example embodiment, a processing means may be configured to determine the one or more connections of the node based on the texture information. An example of the processing means may include the processor 202, which may be an example of the controller 108.

In an example embodiment, the apparatus 200 is caused to determine the one or more connections of the nodes based on a confidence map. In an example embodiment, the confidence map includes information whether a node Ni is a confident disparity node or a non-confident disparity node, and the confidence map may be determined using various ways known in the art. In this example embodiment, the apparatus 200 is caused to access the confidence map for the nodes of the image (I) or may be caused to generate the confidence map. In an example embodiment, the confidence map may be generated based on comparing a first depth map of the image (I) and a second depth map associated with the view image (I') of the image (I). In an example embodiment, the first depth map and the second depth map may be initial depth maps and may be computed based on a non-aggregated (for example, raw) cost volume between the image (I) and the view image (I'). In an example embodiment, the cost volume includes a set of matching costs for nodes Ni (where i varies to include all nodes of the image) of the image (I) and corresponding nodes of the view image (I'), where each matching cost is calculated for a disparity value at a plurality of disparity values (d1, d2 ... dn). In this example embodiment, nodes with erroneous disparities and occlusion nodes (pixels or superpixels) may be obtained by comparing consistency in the first depth map and the second depth map. In this example embodiment, the nodes that are occluded may be labeled as "non-confident disparity nodes" in the confidence map and other nodes may be labeled as "confident disparity nodes" in the confidence map based on thresholding confidence scores. In this example embodiment, if the node (Ni) is a confident disparity node based on the confidence map, the one or more connections of the node (Ni) may only be determined to the one or more nodes that are a first-order of neighboring nodes (the adjoining neighboring nodes) of the node (Ni). However, if the node (Ni) is a non-confident disparity node based on the confidence map, one or more connections of the node (Ni) can be determined to the one or more nodes that belong to the pre-defined image region around the node Ni. In an alternate embodiment, the apparatus 200 may be caused to determine a connection of each non-confident disparity node (Ni) to at least one confident disparity node whether the at least one confident disparity node is an adjoining neighboring node or belongs to the pre-defined region around the 'non-confident disparity' node (Ni). In another example embodiment, confidence score for each node can be computed without using initial depth maps and instead by analyzing data cost for that node for a plurality of disparities. Suitable techniques known in the art for confidence measure based on data cost already may be used. Further, multiple confidence scores can be computed (for example from comparing left/right disparities and data cost), and the multiple confidence scores can be combined in some manner (for example, by multiplication, weighted addition, and the like) for determining the confidence map.

It should be noted that a graph G is defined as G=(N, C) where each node N corresponds to a pixel or a superpixel in the image (I), and each connection C represents an edge between two nodes. In an example embodiment, each of the edges is associated with an edge weight (W) that depends upon the similarity parameter of the two nodes and/or spatial distance between the two nodes. For example, in an example embodiment, the apparatus 200 is caused to assign more edge weights to connections of the node (Ni) to adjoining neighboring nodes of the node (Ni) than connections to nodes that are not adjoining neighboring nodes but belong to the pre-defined image region around the node (Ni). For instance, in an example, a maximum edge weight that is assigned to a connection between the node (Ni) and an adjoining neighboring node of the node (Ni) (that is spatially connected to the node) is Wmax. In this example, edge weights for connections of the node with those nodes that lie within a circle of radius R from the node are less than Wmax, for example, equal to $\alpha W_{max}$, where $\alpha$ is a factor lying between 0 to 1 ($0<=\alpha<=1.0$), where $\alpha$ can be dependent on the spatial distance between the two nodes.

In an example embodiment, the apparatus 200 is caused to determine disparity values at the plurality of nodes of the image based at least on applying a tree based aggregation of the cost volume on the graph. In an example embodiment, the apparatus 200 is caused to determine a minimum spanning tree based on the graph. In an example embodiment, the minimum spanning tree may be determined by selecting a subset of edges (connecting the nodes (N1, N2 . . . Nn)) from the graph G such that a sum of edge weights are minimum for the subset of edges. One such technique of determining the minimum spanning tree is set forth in Mei, Xing, et al. "Segment-Tree based Cost Aggregation for Stereo Matching" in *Computer Vision and Pattern Recognition (CVPR), 2013 IEEE Conference on IEEE,* 2013. In an example embodiment, a processing means may be configured to determine the disparity values at the plurality of nodes of the image. An example of the processing means may include the processor 202, which may be an example of the controller 108.

In an example embodiment, the apparatus 200 is caused to determine disparity value at each node of the plurality of nodes of the image. In an example embodiment, the apparatus 200 is caused to determine the disparity values at the plurality of nodes of the image based on accessing the cost volume, aggregating the cost volume based on the minimum spanning tree and selecting the disparity values for the nodes based on aggregated cost volume.

Various suitable techniques may be used to determine the disparity values at the plurality of nodes of the image based on the tree based aggregation of the graph. Some example embodiments of determining the disparity values at the node of the image are explained in following description, however, these example embodiments should not be considered as limiting to the scope of the present technology. In an example embodiment, the apparatus 200 is caused to access the cost volume for the image. In an example embodiment, the cost volume includes a set of matching costs for each of the plurality of nodes of the image (I), where each matching cost is computed for a disparity value of the plurality of disparity values. In an example, for a node Ni of the image (I), a set of matching costs is calculated for the plurality of disparity values by matching the node Ni and corresponding node in a view image (I'), taking into account the plurality of disparity values (for example, the images I and I' have two different views of the scene such that there is a disparity between the images I and I'). In an example embodiment, correspondence between nodes, for example, pixels in two images (I and I') may be determined based on any suitable correspondence estimation techniques known in the art. In an example embodiment, a matching cost for a node Ni (at a location (x,y) in the image I) for a disparity value (di) may be a dissimilarity or similarity between the node Ni and a collocated node in the image I' at location offset by the disparity value (di) of the location (x,y). In an example, each matching cost for a node represents a data cost for matching the node in I and the corresponding collocated node in I' for a given disparity value of the plurality of disparity values (d1, d2 . . . dn). In an example, the set of matching costs for the node Ni includes n number of matching costs calculated for n number of disparity values. In an example, a matching cost may refer to a degree of similarity between two corresponding pixels (for example, Ni and Ni') in the images I and I', where the degree of similarity is measured in terms of intensity, color, or other image features. In an example, if a node Ni is a pixel, the matching cost is computed using a color difference between the node Ni of the image I1 and the corresponding node Ni' of the image I'. In the case where the nodes are superpixels, data cost can be computed at a pixel level for each pixel of the superpixels for the disparity range (d1, d2 . . . dn), and pixel level data costs are combined within each superpixel to represent the data cost for that superpixel. In an example embodiment, the cost volume may also be computed based on a texture similarity between images, for example a hamming distance between census transform values. In another example embodiment, the cost volume can also be computed based on a parameter between the images I and I', where the parameter is a weighted combination of color difference and texture distance between the images I and I'.

In an example embodiment, the apparatus 200 is caused to perform the tree based aggregation of the cost volume based on the minimum spanning tree and edge weights for generating an aggregated cost volume for the image (I). In this embodiment of determining the disparity value at nodes Ni (i varies to include all nodes of the image (I)), the apparatus 200 is caused to aggregate the plurality of matching costs for the plurality of disparity values based on the minimum spanning tree to determine a plurality of aggregated costs for the nodes Ni. In this example, each aggregated cost of the plurality of aggregated costs corresponds to a disparity value of the plurality of disparity values (d1, d2 . . . dn). In an example embodiment, the apparatus 200 is caused to aggregate the plurality of matching costs (the cost volume) based on the minimum spanning tree and the edge weights to determine a plurality of aggregated costs for the plurality of disparity values (d1, d2 . . . dn) for the nodes Ni. For example, the plurality of aggregated costs are determined for the nodes Ni for the plurality of disparity values (d1, d2 . . . dn), and the plurality of aggregated costs may be referred to as aggregated cost volume of the image (I). In an example, the minimum spanning tree and the aggregated cost volume may be determined using a cost aggregation method as set forth in Qingxiong Yang, "A Non-Local Cost Aggregation Method for Stereo Matching," in *CVPR*2012, pp. 1402-1409, or as set forth in Mei, Xing, et al. "Segment-Tree based Cost Aggregation for Stereo Matching" in *Computer Vision and Pattern Recognition (CVPR), 2013 IEEE Conference on IEEE,* 2013. In an example embodiment, a processing means may be configured to determine the aggregated cost volume of the image. An example of the processing means may include the processor 202, which may be an example of the controller 108.

In this embodiment of determining the disparity values at the plurality of nodes of the image (I), the apparatus 200 is caused to select the disparity values at the plurality of nodes based on corresponding plurality of aggregated costs of the aggregated cost volume. In an example embodiment, the apparatus 200 is caused to select a disparity value at a given node by selecting a disparity value from the plurality of disparity values (d1, d2 . . . dn) for which there is a least aggregated cost from among the plurality of aggregated costs for the given node. In an example embodiment, the apparatus 200 is caused to determine the disparity value at the given node of the image (I) by applying a winner take all method on the aggregated cost volume. For instance, if the plurality of aggregated costs for the node are represented as (A1, A2 . . . An) corresponding to the plurality of disparity values (d1, d2 . . . dn) respectively, and if A2 is the least among A1, A2 . . . An, the disparity value d2 is selected as the disparity value at the node. Similarly, the disparity values at all nodes (Ni, where i varies to include all nodes of the image (I)) of the image (I) are determined using the aggregated cost volume. In an example embodiment, a processing means may be configured to determine the disparity values at each node of the image based on the aggregated data cost volume. An example of the processing means may include the processor 202, which may be an example of the controller 108.

Various example embodiments of the present technology may be used to filter disparity values of a disparity map that is already available or is determined by using some standard techniques. For example, the apparatus 200 may be caused to access primary disparity values at the plurality of nodes of the image. In an example, the apparatus 200 may receive the initial disparity values at the nodes (N1, N2 . . . Nm) of the image, or the apparatus 200 may determine the initial disparity values at the nodes (N1, N2 . . . Nm) of the image based on some standard techniques. In such example embodiment, the apparatus 200 is caused to filter the initial disparity values to determine the disparity values at the plurality of nodes (N1, N2 . . . Nm) based on performing a tree based aggregation on a minimum spanning tree determined from a graph, where the graph is determined based on the one or more example embodiments.

In an example embodiment, the apparatus 200 is caused to determine the disparity value at a node (for example, a pixel p) of the plurality of nodes (N1, N2 . . . Nn) based on an expression (1):

$$d_p = \frac{1}{N_p} \Sigma_{q \in I} e^{-\frac{D(p,q)}{\sigma}} d_q, \qquad (1)$$

where dp is the disparity value at a pixel p of the image (I), dq is an initial disparity value at a pixel q of the image (I), D(p,q) is a distance between the pixel p and the pixel q in the minimum spanning tree determined from the graph, Np is a normalizing term for the pixel p and σ is a constant. In an example embodiment, the normalizing term Np is determined based on an expression (2):

$$N_p = \Sigma_{q \in I} e^{-\frac{D(p,q)}{\sigma}} \qquad (2)$$

In an example embodiment, the initial disparity values at any given image may be filtered to determine refined disparity values at the nodes of the image based on the tree based aggregation performed on a minimum spanning tree, where the minimum spanning tree is determined based on the graph determined from various example embodiments.

Figure 3A:
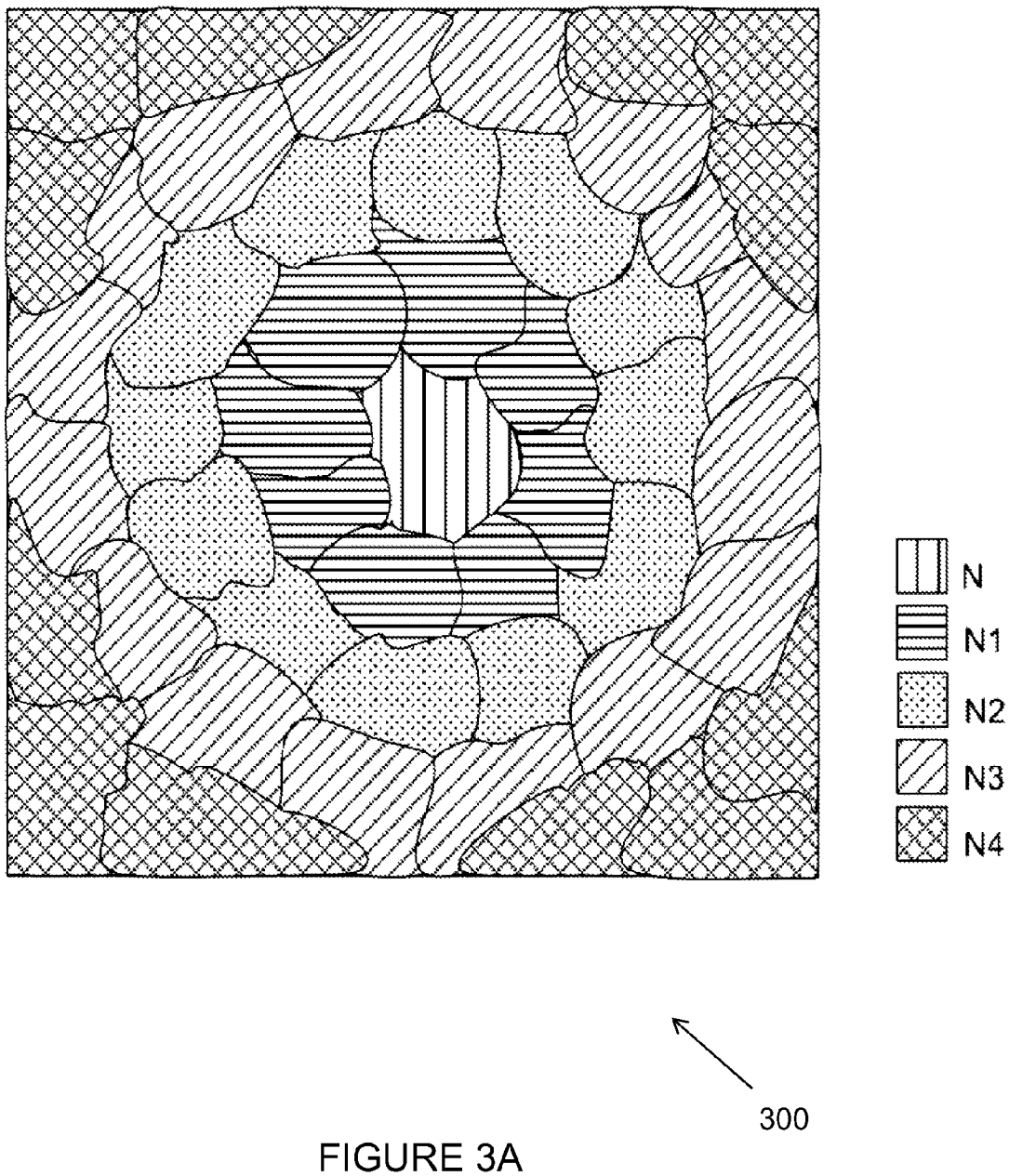
FIG. 3A illustrates an example representation of a pre-defined image region around a node in a image, in accordance with an example embodiment.

FIG. 3A illustrates an example representation 300 of pre-defined image region around a node in an image, in accordance with an example embodiment. In this example representation, a pre-defined image region around the node N (for example, a superpixel N), for example, a local neighborhood of the node N is shown. In this example, the pre-defined image region is taken as a pre-defined order (for example, 3-order) of neighboring nodes of the node N. In this example, the pre-defined image region around the superpixel N comprises superpixels N1, N2 and N3. For example, the superpixels that are spatially adjacent to the superpixel N are defined as first-order neighboring nodes (shown as N1). In this example, spatially adjacent neighboring superpixels of the first-order neighboring nodes (N1) are defined as second-order neighboring nodes (shown as N2). In this example, spatially adjacent neighboring superpixels of the second-order neighboring nodes (N2) are defined as third-order neighboring nodes (shown as N3). Further, it should be noted that as the pre-defined order is set as three, the fourth-order neighboring nodes (shown as N4) do not form the pre-defined image region around the superpixel N. In this example embodiment, various connections are determined between the superpixel N and one or more superpixels from among the superpixels N1, N2 and N3, where the edge weights of the connections are determined based on the similarity parameters between the superpixel N and the corresponding superpixels (of N1, N2 and N3) and/or spatial distances between centroids of the superpixel N and corresponding centroids of the superpixels (of N1, N2 and N3).

Figure 3B:
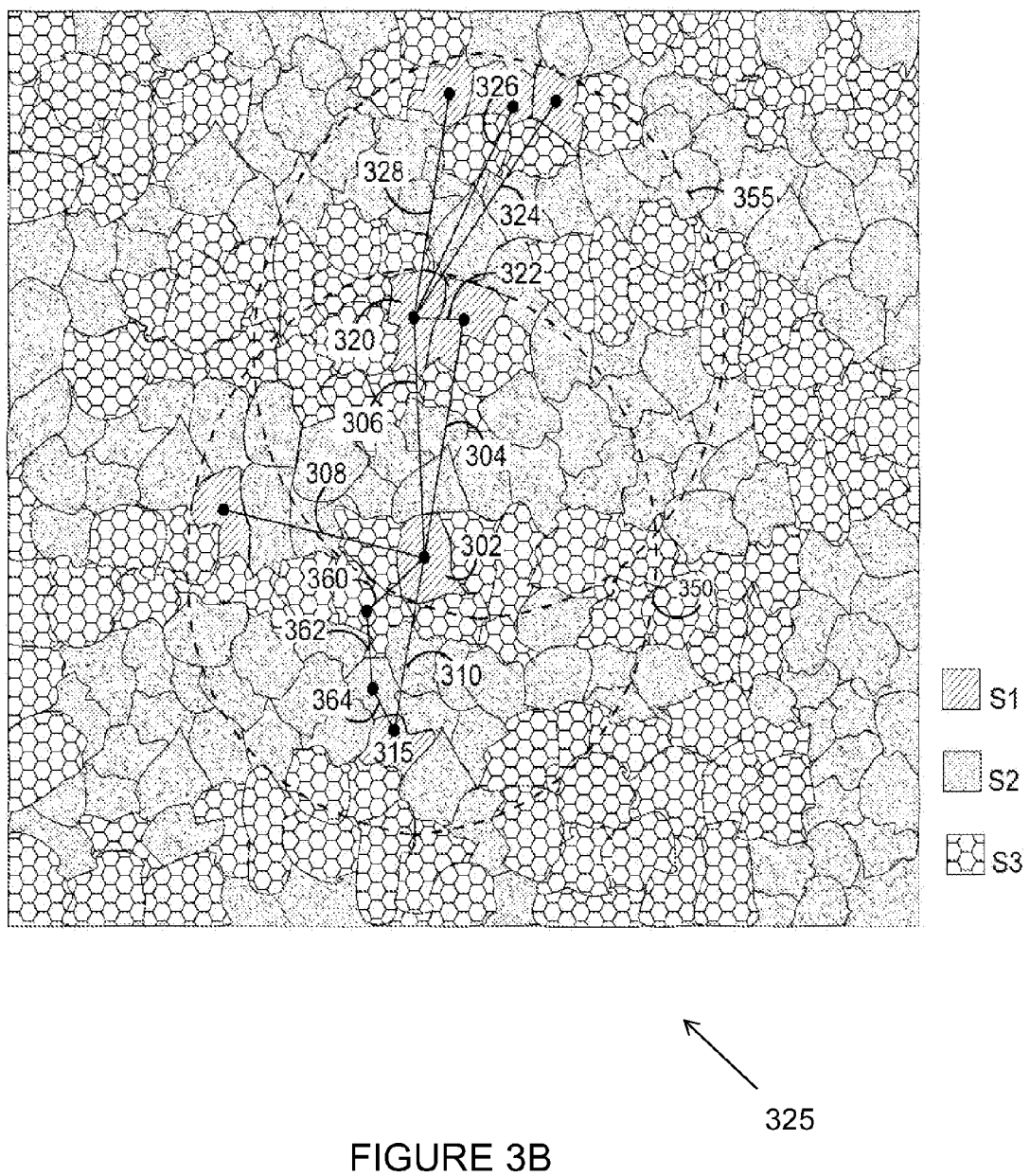
FIG. 3B illustrates another example representation of a pre-defined image region around a node in an image and connection of the node in the image for determining a graph, in accordance with an example embodiment.

FIG. 3B illustrates an example representation 325 of a pre-defined image region around a node in an image and connection of the node in the image for determining a graph, in accordance with another example embodiment. In this representation 325, there are three kinds of nodes (for example superpixels) shown for example purposes only. In this representation 300, a first kind of similar superpixels are shown as S1 (hereinafter also referred to as superpixel S1), a second kind of similar superpixels are shown as S2

(hereinafter also referred to as superpixel S2) and a third kind of similar superpixels are shown as S3 (hereinafter also referred to as superpixel S3). It should be noted that the similar superpixels, for example, superpixels S1 may be considered as similar superpixels based on the similarity parameters between the superpixels S1, and similarly, the superpixels S2 and the superpixel S3 are also similar among themselves. It should also be noted that the superpixels S1, S2 and S3 are taken as example of the nodes of the image, however S1, S2 and S2 may also represent a plurality of similar pixels and may be example of the nodes of the image.

In an example embodiment, the graph is determined by determining one or more connections of each given node of the image based on determining the one or more similar nodes (belonging to the pre-defined image region around the given node) for the given node. In an example embodiment, for a node, connections can be determined with all nodes in a local neighborhood or within a pre-defined spatial distance. In some example embodiments, in order to reduce a density of the graph, connections for the node can only be determined with adjoining nodes of the node, and with one or more similar nodes belonging to the pre-defined image region around the node. In such example embodiments, one or more similar nodes belonging to the pre-defined image region may be selected by comparing edge weights to a threshold edge weight. For example, a connection of a given node can be made to a non-adjacent node (belonging to the pre-defined image region) only if the edge weight between the given node and the non-adjacent node is less than the threshold edge weight (for example in conditions if the given node and the non-adjacent node are sufficiently 'similar' to each other). Such example embodiments are described with reference to FIG. 3B.

In an example embodiment, the graph is determined by connecting the plurality of nodes (for example superpixels S1, S2 and S3) of the image. In an example embodiment, the graph is determined by determining connections of a superpixel of the image to one or more superpixels within the pre-defined image region around the superpixel in the image. In an example embodiment, the connections may be determined for the superpixel based on similarity parameters between the superpixel and the one or more superpixels, where the one or more superpixels lie within a pre-defined spatial distance from the superpixel. For instance, a superpixel of the superpixels S1 (shown by 302, and also hereinafter referred to as superpixel 302) may be connected to the one or more superpixels of the superpixel S1 lying within the pre-defined spatial distance from the superpixel 302. For instance, the superpixel 302 may be connected to the superpixels S1 that are within a circle 350 of a pre-defined radius R having center at a centroid of the superpixel 302. For the example representation 325, reference numerals 304, 306, 308 and 310 depicted in the FIG. 3B represent connections between the superpixel 302 and other similar superpixels S1 within the circle 350. In this example representation of FIG. 3B, only few connections are shown for the superpixels (for example, connections with the adjoining superpixels of the superpixel 302 are not shown), and these connections serve merely for example purposes only. In the above example, one or more connections are determined for any given superpixel of the superpixels S1, S2 or S3 with one or more superpixels belonging to the pre-defined image region (for example, lying within the radius R from the given superpixels) around the given superpixels. For instance, the superpixels S1 (shown by 320, and also hereinafter referred to as superpixel 320) may be connected to the one or more superpixels S1 belonging within (for example, lying within) the pre-defined spatial distance from the superpixel 320. For instance, the superpixel 320 may be connected to superpixels S1 that are within a circle 355 of the pre-defined radius R having center at a centroid of the superpixel 320. For the example representation 325, reference numerals 322, 324, 326, 328 and 306 depicted in the FIG. 3B represent connections between the superpixel 320 and other similar superpixels S1 within the circle 355.

It should be noted that the graph is determined by determining one or more connections of the nodes to not only the adjoining neighboring nodes of the nodes, but also to the similar nodes that belong to the pre-defined image region (for example, within pre-defined spatial distance or within the local neighborhood) of the nodes. In an example embodiment, the graph determined by such connections is a denser graph compared to any standard techniques of determination of the graph in the image. For example, there is no adjoining neighboring superpixel S1 that are similar to the superpixel 302, and accordingly in standard techniques, the superpixel 302 is connected to another similar superpixel, for example, superpixel S1 (shown by 315) through connections 360, 362 and 364. As the connection 360 connect two dissimilar superpixels S1 and S3, the connection 362 connects two dissimilar superpixels S2 and S3, and the connection 364 connects two dissimilar superpixels S1 and S2, and if the connections 360, 362 and 364 are in the minimum spanning tree, the effect of the superpixel 315 onto the superpixel 302 in the tree based aggregation is poor. However, it should be noted that in an example embodiment of the present technology, the similar superpixels, for example, superpixels 302 and the superpixel 315 are directly connected by the connections 310 even if these superpixels are not adjoining neighboring superpixels (as the superpixel 315 belongs to, for example, lies within the pre-defined image region around the superpixel 302), and such type of connections in the graph make the graph denser and accordingly the tree based aggregation is improved.

Figure 4A:
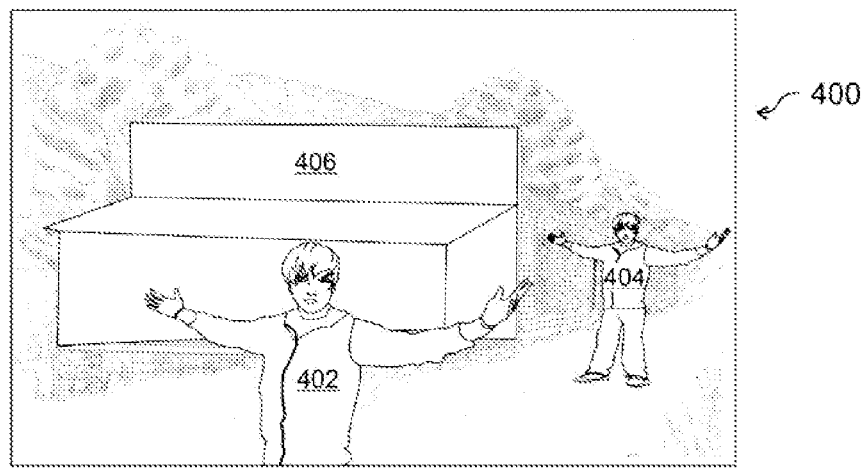
FIG. 4A illustrates an example representation of an image.

FIG. 4A illustrates an example representation of an image 400. The image 400 is captured by an image capturing device (for example, the image capturing device 208). For the representation purposes, the image 400 is shown as including a man 402, another man 404 and a building 406 among other things. It should be noted that there is another view image (not shown) of the scene associated with the image 400 captured by the image capturing device 208, so as to determine disparity values at the nodes of the image 400.

Figure 4B:
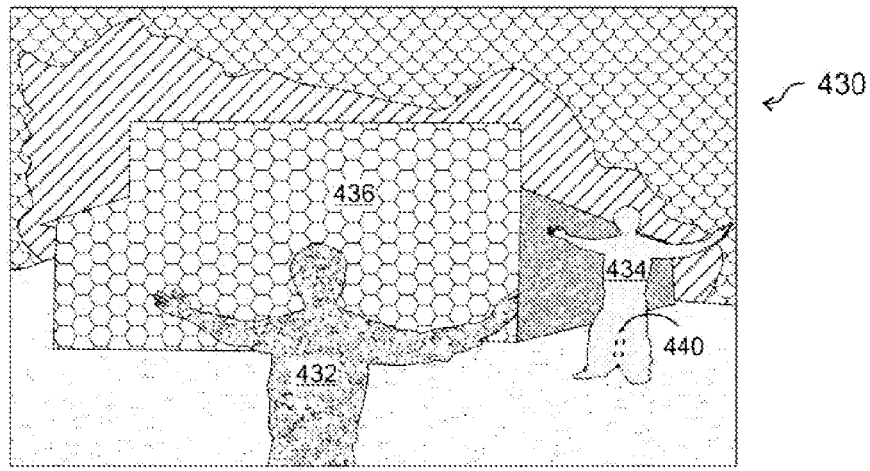
FIG. 4B illustrates an example representation of a disparity map of the image obtained by a standard method.
Figure 4C:
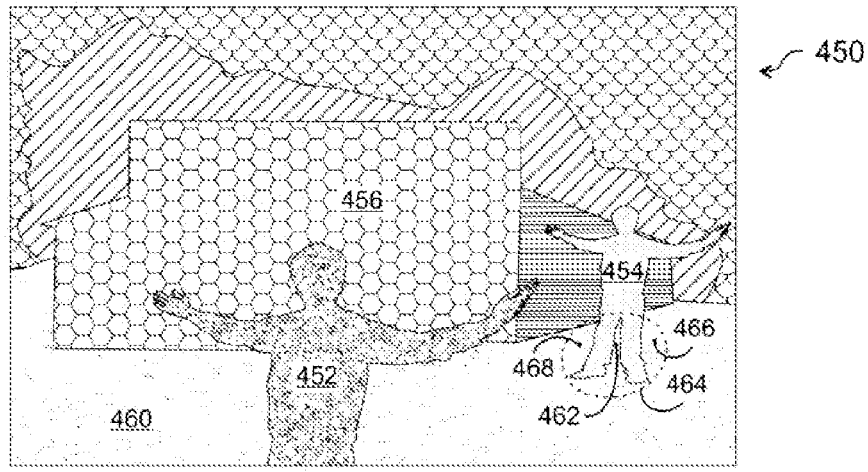
FIG. 4C illustrates an example representation of a disparity map of the image obtained, in accordance with an example embodiment.

FIGS. 4B and 4C illustrate example representations of disparity maps 430 and 450 of the image 400, respectively. It should be noted that the disparity maps 430 and 450 are shown for representation purposes only; and such representations are not provided to represent accurate disparity maps associated with the image 400 as shown in FIG. 4A, but to facilitate description of some example embodiments only. The disparity map 430 of FIG. 4B represents a disparity map for the image 400 that is generated using a standard technique without using any of the example embodiments described herein, whereas the disparity map 430 represents a disparity map for the image 400 that is generated in accordance with an example embodiment of the present technology.

In the example representation of the disparity map 430, a disparity 432 corresponds to the nodes of the man 402, a disparity 434 corresponds to the nodes of the man 404 and a disparity 436 corresponds to the nodes of the building 406, among other things. In the example representation of the disparity map 450, a disparity 452 corresponds to the nodes of the man 402, a disparity 454 corresponds to the nodes of the man 404 and a disparity 456 corresponds to the nodes of the building 406, among other things.

It should be noted that disparity at the nodes of some regions in the disparity map 430, is not proper as compared to disparity of corresponding nodes in the disparity map 450. For instance, the disparity at nodes in the region 440 is shown as the disparity 434, whereas the disparity at the nodes in the corresponding region in the disparity map 450 is shown as a disparity 460.

As shown in FIG. 4C, while determining the graph for the image 400 for determining the disparity map for the image 400, connections are determined between any given node and one or more similar nodes where the one or more similar nodes are located within the pre-defined image region (the local neighborhood of the given node or within the pre-defined spatial distance from the given node) around the given node. In this example representation, connections of a node 462 with the similar nodes present in the circle 464 are determined for determining the graph. For example, the node 462 may be connected to nodes 466 and 468 lying within the circle 464, and accordingly cost aggregation (for determining the disparity value) for the node 462 is improved due to direct connections of the node 462 with the similar nodes 466 and 468, and such improved cost aggregation causes an improved disparity estimation for the node 462. It should be further be noted that in case of standard techniques, disparity estimation for nodes lying in a narrow region 440 may not be accurate if the connections of the nodes lying in the region 440 are only determined with the adjoining neighboring nodes of the respective nodes.

Figure 5:
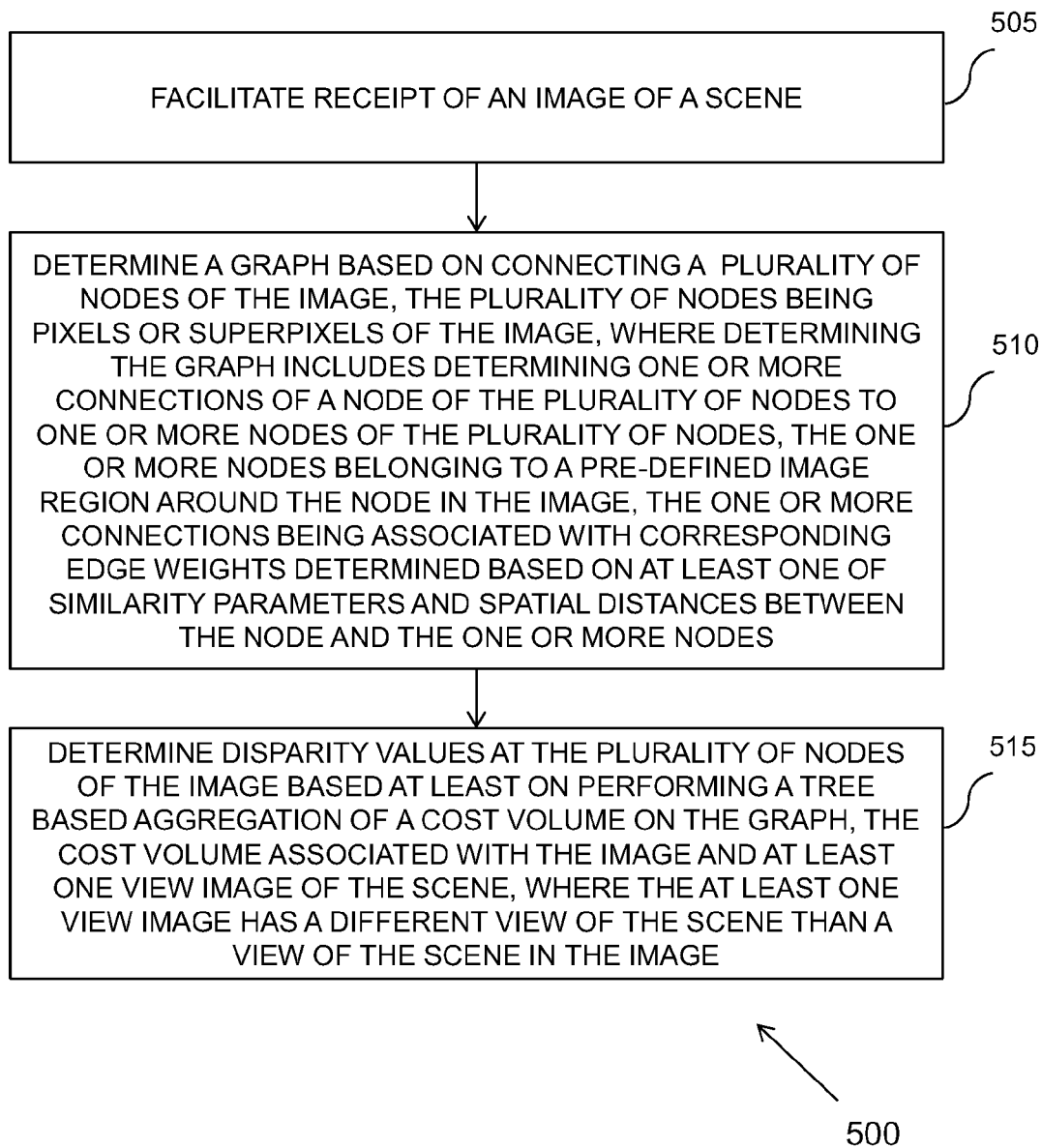
FIG. 5 is a flowchart depicting an example method for disparity estimation in an image, in accordance with an example embodiment.

FIG. 5 is a flowchart depicting an example method 500 for disparity estimation in images, in accordance with an example embodiment. The method 500 is shown and explained with reference to FIG. 2. The method 500 depicted in the flowchart may be executed by, for example, the apparatus 200 of FIG. 2.

At 505, the method 500 includes facilitating receipt of an image of a scene. In an example embodiment, the image may be captured by an image capturing device, for example the image capturing device 208. Alternatively, the image may be received from external sources accessible to the apparatus 200.

At 510, the method 500 includes determining a graph based on connecting a plurality of nodes of the image. In an example embodiment, the plurality of nodes are associated with pixels or superpixels of the image. In an example embodiment, the graph is determined by determining one or more connections of a node (for example, Ni, where i varies to include all nodes of the image) to one or more nodes belonging to a pre-defined image region around the node. In an example embodiment, the pre-defined image region comprises local neighborhood (a pre-defined order of neighboring nodes) around the node, as described with reference to FIG. 3A. In another example embodiment, the pre-defined image region is an image region defined by nodes located within a pre-defined spatial distance from the node, as described with reference to FIG. 3B. In an example embodiment, the method 500 includes determining the one or more connections for all nodes of the plurality of nodes with their respective one or more nodes belonging to the pre-defined image region around the nodes. For instance, if there are plurality of nodes (N1, N2 . . . Nm), the connections are individually determined for each of the plurality of nodes (N1, N2 . . . Nm). In an example embodiment, the method 500 includes determining the graph based on the connections determined for each of the plurality of nodes (N1, N2 . . . Nm). It should be noted that the spatial distance between the two nodes that are pixels may be a spatial difference between the locations of the two pixels. Further, it should be noted that the spatial distance between the two nodes that are superpixels may be a spatial distance between locations of centroids of the two superpixels.

In an example embodiment, the connections determined in the graph have associated edge weights. If a connection is determined between nodes N1 and N2 (where node N2 is within pre-defined image region of the node N1), an edge weight of the connection is dependent upon a similarity parameter between the nodes N1 and N2. Additionally or alternatively, the edge weight of the connection between the nodes N1 and N2 is also dependent upon a spatial distance between the nodes N1 and N2.

It should be noted that the graph obtained by the operation of the block 510 has more edges in textured regions of the image, and any disparity values obtained by using the graph provides a reliable disparity values. At 515, the method 500 includes determining disparity values at the plurality of nodes of the image based at least on applying a tree based aggregation of a cost volume on the graph. In an example embodiment, the cost volume is associated with the image and at least one view image of the scene. The at least one view image includes a different view of the scene than a view of the scene in the image. Another detailed example embodiment of the disparity estimation is further explained with reference to FIG. 6.

Figure 6:
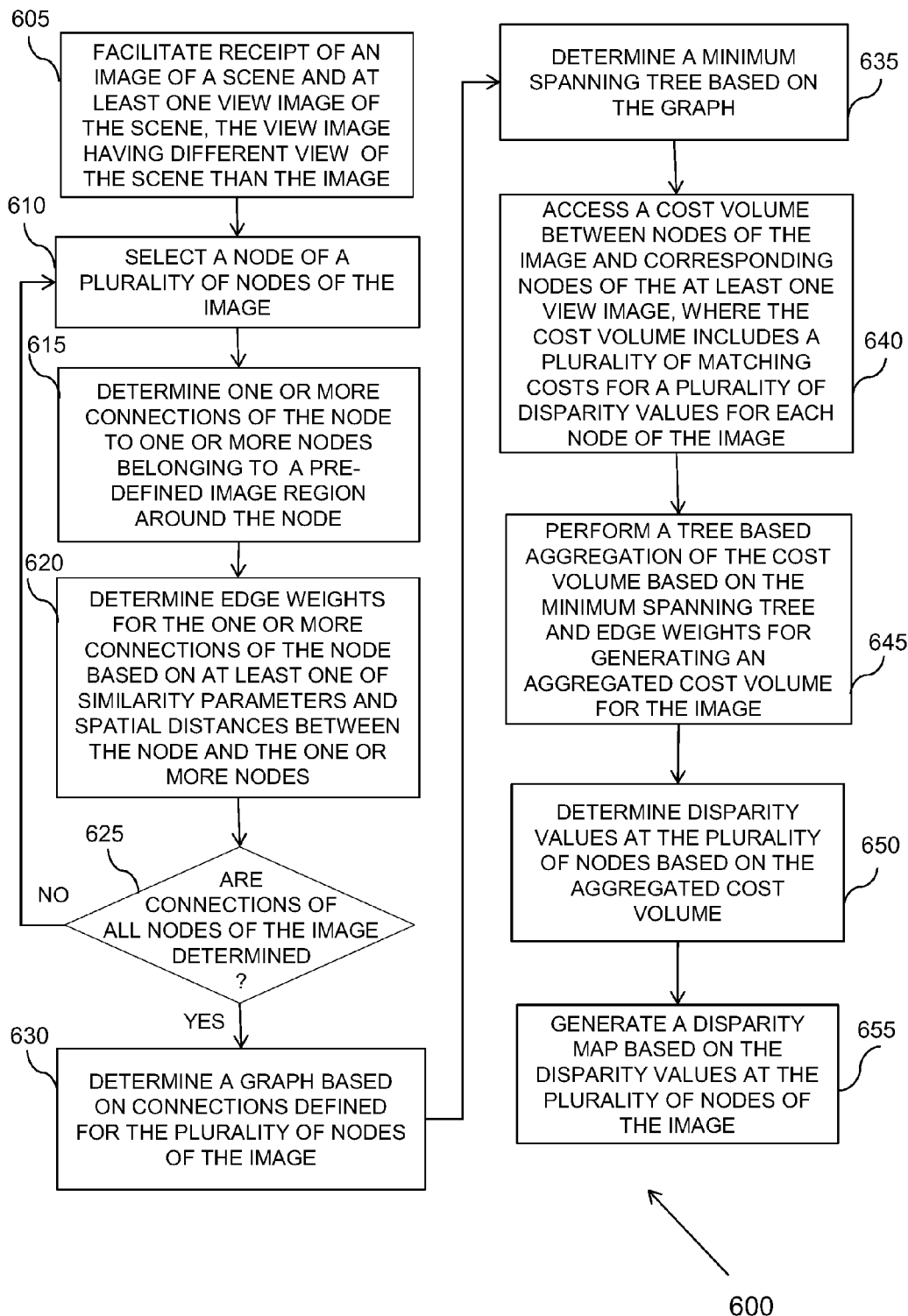
FIG. 6 is a flowchart depicting an example method for disparity estimation in the image, in accordance with another example embodiment.

FIG. 6 is a flowchart depicting an example method 600 for disparity estimation in images, in accordance with another example embodiment. The method 600 is shown and explained with reference to FIG. 2. The method 600 depicted in the flowchart may be executed by, for example, the apparatus 200 of FIG. 2.

At 605, the method 600 includes facilitating receipt of an image of a scene and at least one view image of the scene. In an example embodiment, the view image has a different view of the scene than the image. In an example embodiment, the image and the at least one view image may be captured by the image capturing device 208. Alternatively, the image and the at least one view image may be received from external sources accessible to the apparatus 200.

At 610, the method 600 includes selecting a node (for example, N1) of the image. In an example, the node may be selected from a plurality of nodes (N1, N2 . . . Nn) of the image, where the plurality of nodes may be a plurality of pixels or a plurality of superpixels of the image. At 615, the method 600 includes determining one or more connections of the node (N1) to one or more nodes of the plurality of nodes (N1, N2 . . . Nn). In an example embodiment, the one or more nodes belong to a pre-defined image region around the node (N1). In an example embodiment, the pre-defined image region may include local neighborhood (a pre-defined order of neighboring nodes) around the node (N1). In another example embodiment, the pre-defined image region may include those nodes that are located within a pre-defined spatial distance from the node (N1). Some examples of the pre-defined image regions are described with reference to FIGS. 3A and 3B.

At 620, the method 600 includes determining edge weights for the one or more connections of the node (N1) based on at least one of similarity parameters and spatial distances between the node (N1) and the one or more nodes that are connected to the node (N1). At 625, it is checked whether the one or more connections are determined for all nodes of the plurality of nodes (N1, N2 . . . Nn). If the connections of all nodes (N1, N2 . . . Nn) of the image are not determined, operations of the blocks 610, 615 and 620 are repeated till the connections of the plurality of nodes (N1, N2 . . . Nn) are determined.

At 630, the method 600 includes determining a graph based on the connections determined for the plurality of nodes (N1, N2 . . . Nn) of the image. As described with reference to FIG. 2, the graph G may be determined as G=(N, C) where each node N corresponds to a pixel or superpixel in the image, and each connection C represents an edge between two nodes. At 635, the method 600 includes determining a minimum spanning tree based on the graph. In an example embodiment, the minimum spanning tree may be determined by selecting a subset of edges (connecting the nodes (N1, N2 . . . Nn)) from the graph G such that a sum of edge weights are minimum for the subset of edges.

At 640, the method 600 includes accessing a cost volume between the nodes of the image and corresponding nodes of the view image. In an example embodiment, the cost volume includes a plurality of matching costs for a plurality of disparity values (d1, d2 . . . dn) for each node of the image. Some example embodiments of accessing the cost volume are described with reference to FIG. 2.

At 645, the method 600 includes performing a tree based aggregation of the cost volume based on the minimum spanning tree and edge weights for generating an aggregated cost volume for the image. For example, the method 600 includes aggregating the plurality of matching costs for the plurality of disparity values (d1, d2 . . . dn) based on the minimum spanning tree to determine a plurality of aggregated costs for each node Ni (i varies to include all nodes of the image) of the image. In this example, each aggregated cost for a node Ni of the plurality of aggregated costs corresponds to a disparity value of the plurality of disparity values (d1, d2 . . . dn). For example, the plurality of aggregated costs is determined for the node Ni of the image for the plurality of disparity values (d1, d2 . . . dn). The plurality of aggregated costs for all nodes (Ni, where i varies to include each node of the image) may be referred to as aggregated cost volume for the image.

At 650, the method 600 includes determining the disparity values at the plurality of nodes based on the aggregated cost volume. In an example embodiment, for a given node Ni, a disparity value is selected based on the plurality of aggregated costs for the node Ni. In an example embodiment, the method 600 includes selecting the disparity value at the node Ni by selecting a disparity value from the plurality of disparity values (d1, d2 . . . dn) for which there is a least aggregated cost from among the plurality of aggregated costs for the node Ni. For instance, if the plurality of aggregated costs for the node Ni are represented as (A1, A2 . . . An) corresponding to the plurality of disparity values (d1, d2 . . . dn) respectively, and if A2 is the least among A1, A2 . . . An, the disparity value d2 is selected as the disparity value at the node Ni. At 655, the method 600 optionally includes generating a disparity map based on the disparity values at the plurality of nodes (N1, N2 . . . Nm) of the image.

It should be noted that to facilitate discussions of the flowcharts of FIGS. 5 and 6, certain operations are described herein as constituting distinct steps performed in a certain order. Such implementations are examples only and non-limiting in scope. Certain operation may be grouped together and performed in a single operation, and certain operations can be performed in an order that differs from the order employed in the examples set forth herein. Moreover, certain operations of the methods 500 and 600 are performed in an automated fashion. These operations involve substantially no interaction with the user. Other operations of the methods 500 and 600 may be performed by in a manual fashion or semi-automatic fashion. These operations involve interaction with the user via one or more user interface presentations.

The methods depicted in these flow charts may be executed by, for example, the apparatus 200 of FIG. 2. Operations of the flowchart, and combinations of operation in the flowcharts, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus, provide operations for implementing the operations in the flowchart. The operations of the methods are described with help of apparatus 200. However, the operations of the methods can be described and/or practiced by using any other apparatus.

Without in any way limiting the scope, interpretation, or application of the claims appearing below, a technical effect of one or more of the example embodiments disclosed herein is to improve disparity estimation in digital images. Various example embodiments provision for disparity estimation in an image by cost aggregation on a minimum spanning tree (MST) that is derived from a graph based on connections of nodes of the image. While determining the graph, in various example embodiments, more number of connections between the nodes of the images is considered as compared to a number of connections between the nodes considered in standard techniques, especially in textured regions of the images. As opposed to several standard techniques where the cost aggregation is not effective in highly textured regions as compared to other regions, aggregation is particularly effective in highly textured regions in various example embodiments. For instance, in highly textured areas of the image, two nodes (for example, pixels or superpixels) in the neighborhood may be similar in appearance, but there is a high chance that the distance between them on a graph (formed by a standard technique) can be quite high due to presence of a number of edges or high gradients in intensity; such issues are handled in various example embodiments by determining connections between nodes that are not spatially connected (but lie within a pre-defined spatial distance) to form the graph for the image.

For instance, in standard techniques, edges in a graph of an image are built between nodes with a cost proportional to similarity in appearance (or some other attribute) between nodes that are immediate spatial neighbors. However, in various example embodiments, the concept of a neighborhood is expanded and edges are allowed to be built between a given node and other nodes within the pre-defined spatial distance of the given node, even if they are not spatial immediate neighbors. Such formation of graph results in a more effective aggregation in high textured regions of the image. Accordingly, various example embodiments improve on the standard techniques by ensuring more effective cost aggregation based on a non-local, non-connected support.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present disclosure as defined in the appended claims.

What is claimed is:

1. A method comprising:
facilitating receipt of an image of a scene;
determining a graph based on connecting a plurality of nodes of the image, the plurality of nodes being pixels or superpixels of the image, wherein determining the graph comprises determining one or more connections of a node of the plurality of nodes to one or more nodes of the plurality of nodes, the one or more nodes belonging to a pre-defined image region around the node in the image, the one or more connections being associated with corresponding edge weights determined based on at least one of similarity parameters and spatial distances between the node and the one or more nodes, wherein determining the graph further comprises accessing a texture map comprising texture information for the plurality of nodes, wherein a texture information for the node of the plurality of nodes represents if the node belongs to a textured region in the image or belongs to a non-textured region in the image; and
determining disparity values at the plurality of nodes of the image based at least on performing a tree based aggregation of a cost volume on the graph, the cost volume associated with the image and at least one view image of the scene, the at least one view image comprising a different view of the scene than a view of the scene in the image.

2. The method as claimed in claim 1, further comprising determining a minimum spanning tree based on the graph.

3. The method as claimed in claim 2, wherein determining the disparity values at the plurality of nodes comprises:
accessing the cost volume between the plurality of nodes of the image and corresponding plurality of nodes of the at least one view image, wherein the cost volume comprises a plurality of matching costs for a plurality of disparity values at each node of the image;
performing the tree based aggregation of the cost volume based on the minimum spanning tree and edge weights for generating an aggregated cost volume for the image, wherein the aggregated cost volume comprises a plurality of aggregated costs for the plurality of disparity values at each node of the image; and
determining the disparity values at the plurality of nodes based on the aggregated cost volume.

4. The method as claimed in claim 2, wherein determining the disparity values at the plurality of nodes of the image comprises:
accessing initial disparity values at the plurality of nodes of the image; and
filtering the initial disparity values to determine the disparity values at the plurality of nodes based on the tree based aggregation of the cost volume on the minimum spanning tree determined from the graph.

5. The method as claimed in claim 1, wherein determining the one or more connections of the node of the plurality of nodes to the one or more nodes further comprises:
accessing the texture information for the node; and
determining the one or more connections of the node to the one or more nodes based on the texture information.

6. The method as claimed in claim 1, wherein determining the one or more connections of the node of the plurality of nodes to the one or more nodes further comprises:
accessing a confidence map comprising information if the node is a confident disparity node or a non-confident disparity node; and
determining the one or more connections of the node to the one or more nodes based on the confidence map.

7. The method as claimed in claim 6, wherein the pre-defined image region around the node comprises nodes located within a pre-defined spatial distance from the node in the image if the node is the non-confident disparity node.

8. The method as claimed in claim 1, wherein determining the one or more connections of the node to the one or more nodes further comprises determining edge weights associated with the one or more connections of the node to the one or more nodes based on the similarity parameters between the node and the one or more nodes.

9. An apparatus comprising:
at least one processor; and
at least one memory comprising computer program code, the at least one memory and the computer program code configured to, with the at least one processor, cause the apparatus to at least perform:

facilitate receipt of an image of a scene;

determine a graph based on connecting a plurality of nodes of the image, the plurality of nodes being pixels or superpixels of the image, wherein determining the graph comprises determining one or more connections of a node of the plurality of nodes to one or more nodes of the plurality of nodes, the one or more nodes belonging to a pre-defined image region around the node in the image, the one or more connections being associated with corresponding edge weights determined based on at least one of similarity parameters and spatial distances between the node and the one or more nodes, wherein for determining the graph, the apparatus is further caused, at least in part to access a texture map comprising texture information for the plurality of nodes, wherein a texture information for the node of the plurality of nodes represents if the node belongs to a textured region in the image or belongs to a non-textured region in the image; and determine disparity values at the plurality of nodes of the image based at least on performing a tree based aggregation of a cost volume on the graph, the cost volume associated with the image and at least one view image of the scene, the at least one view image comprising a different view of the scene than a view of the scene in the image.

10. The apparatus as claimed in claim 9, wherein the apparatus is further caused, at least in part to determine a minimum spanning tree based on the graph.

11. The apparatus as claimed in claim 10, wherein for determining the disparity values at the plurality of nodes, the apparatus is further caused, at least in part to:

access the cost volume between the plurality of nodes of the image and corresponding plurality of nodes of the at least one view image, wherein the cost volume comprises a plurality of matching costs for a plurality of disparity values at each node of the image;

perform the tree based aggregation of the cost volume based on the minimum spanning tree and edge weights for generating an aggregated cost volume for the image, wherein the aggregated cost volume comprises a plurality of aggregated costs for the plurality of disparity values at each node of the image; and determine the disparity values at the plurality of nodes based on the aggregated cost volume.

12. The apparatus as claimed in claim 10, wherein for determining the disparity values at the plurality of nodes of the image, the apparatus is further caused, at least in part to:

access initial disparity values at the plurality of nodes of the image; and filter the initial disparity values to determine the disparity values at the plurality of nodes based on the tree based aggregation of the cost volume on the minimum spanning tree determined from the graph.

13. The apparatus as claimed in claim 9, wherein for determining the one or more connections of the node of the plurality of nodes to the one or more nodes, the apparatus is further caused, at least in part to:

access the texture information for the node; and determine the one or more connections of the node to the one or more nodes based on the texture information.

14. The apparatus as claimed in claim 9, wherein for determining the one or more connections of the node of the plurality of nodes to the one or more nodes, the apparatus is further caused, at least in part to:

access a confidence map comprising information if the node is a confident disparity node or a non-confident disparity node; and determine the one or more connections of the node to the one or more nodes based on the confidence map.

15. The apparatus as claimed in claim 14, wherein the pre-defined image region around the node comprises a pre-defined order of neighboring nodes of the node in the image if the node is the non-confident disparity node.

16. The apparatus as claimed in claim 14, wherein the pre-defined image region around the node comprises nodes located within a pre-defined spatial distance from the node in the image if the node is the non-confident disparity node.

17. A computer program product comprising at least one computer-readable storage medium, the computer-readable storage medium comprising a set of instructions, which, when executed by one or more processors, cause an apparatus to at least perform:

facilitate receipt of an image of a scene;

determine a graph based on connecting a plurality of nodes of the image, the plurality of nodes being pixels or superpixels of the image, wherein determining the graph comprises determining one or more connections of a node of the plurality of nodes to one or more nodes of the plurality of nodes, the one or more nodes belonging to a pre-defined image region around the node in the image, the one or more connections being associated with corresponding edge weights determined based on at least one of similarity parameters and spatial distances between the node and the one or more nodes, wherein for determining the graph, the apparatus is further caused, at least in part to access a texture map comprising texture information for the plurality of nodes, wherein a texture information for the node of the plurality of nodes represents if the node belongs to a textured region in the image or belongs to a non-textured region in the image; and determine disparity values at the plurality of nodes of the image based at least on performing a tree based aggregation of a cost volume on the graph, the cost volume associated with the image and at least one view image of the scene, the at least one view image comprising a different view of the scene than a view of the scene in the image.

18. The computer program product as claimed in claim 17, wherein the apparatus is further caused, at least in part to determine a minimum spanning tree based on the graph.

* * * * *